(12) United States Patent
Nilsson et al.

(10) Patent No.: US 6,308,585 B1
(45) Date of Patent: Oct. 30, 2001

(54) METHOD AND A DEVICE FOR ATTACHING ULTRASONIC TRANSDUCERS

(75) Inventors: Bo Nilsson, Öregrund; Håkan Dahlberg, Gävle, both of (SE)

(73) Assignee: Ultra Sonus AB, Oregrund (SE)

( * ) Notice: Subject to any disclaimer, the term of this patent is extended or adjusted under 35 U.S.C. 154(b) by 0 days.

(21) Appl. No.: 09/501,843

(22) Filed: Feb. 10, 2000

(51) Int. Cl.⁷ ................................................. G01D 21/00
(52) U.S. Cl. ............................................................ 73/866.5
(58) Field of Search .......................... 73/431, 570, 866.5; 310/348; 29/25.35

(56) References Cited

U.S. PATENT DOCUMENTS 4,173,725 * 11/1979 Asai et al. ............................ 310/325

* cited by examiner

Primary Examiner—Richard A. Moller
(74) Attorney, Agent, or Firm—Jenkens & Gilchrist, P.C.

(57) ABSTRACT

Ultrasonic energy from an ultrasonic transducer 3 is transmitted through a member 1, such as the wall of a vessel, on which the transducer is mounted. A cylindrical projection 2 is formed integral with the member, and the ultrasonic transducer main body is attached to the projection, e.g. by screwing the body onto outer threads of the cylindrical projection. The cylindrical projection is designed to form the lower part of the ultrasonic transducer.

27 Claims, 7 Drawing Sheets

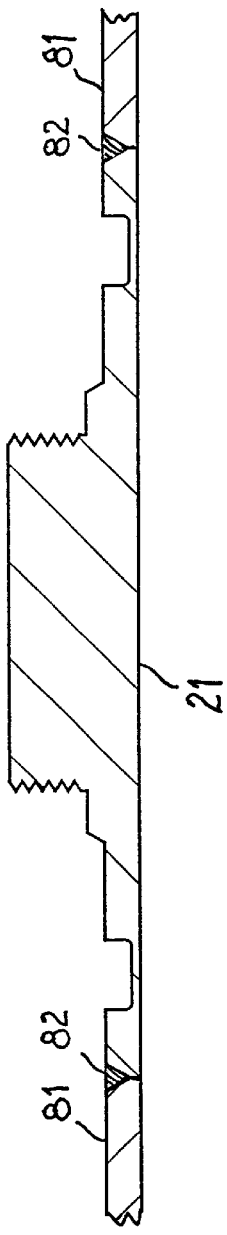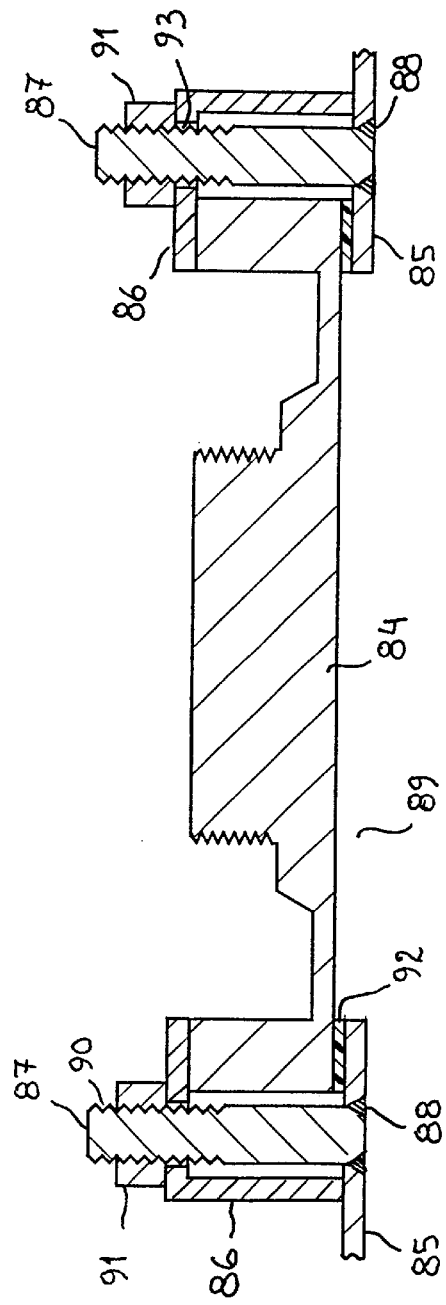

METHOD AND A DEVICE FOR ATTACHING ULTRASONIC TRANSDUCERS

TECHNICAL FIELD OF THE INVENTION

The present invention relates to ultrasonic transducers, and more specifically to a method and a device for attaching ultrasonic transducer to a member, such as a wall of a vessel, a beam or a conduit.

DESCRIPTION OF RELATED ART

Ultrasonic transducers are used for introducing kinetic energy into a fluid, such as water contained in a metal vessel or a metal conduit. Typically, in such applications one or several transducers are attached to the outside of the vessel. Thus, the ultrasonic energy is transmitted through the wall onto which the transducer elements are mounted. Thereby, the wall acts as a vibrating member, vibrated by the transducer elements, to forward the energy to the fluid.

In addition to this, numerous other applications for ultrasonic transducers exist, such as in improving formation in paper machines by adding ultrasonic energy in the wire section of the paper machine, or for compacting concrete or pulverized material. For this kind of applications it is known to attach the transducer elements to a metal member, such as a beam.

Conventionally, when mounting an ultrasonic transducer to a wall or a beam member, a bottom ultrasonic energy emitting section of the transducer is secured to the wall or the beam by welding, screwing or by a bonding procedure using a suitable adhesive, such as an epoxy adhesive.

However, the ultrasonic vibrations generated by an ultrasonic transducer tend to degenerate the strength of a bonding, especially in the case of high-energy transducers. Furthermore, due to the low rigidity of the bonding material, as compared to the metal of the transducer and the member, the transmission efficiency through the bonding and the member is reduced.

In the case of welding the emitting body of an ultrasonic transducer to a member, a welded joint is sensitive to crack propagation emanating in an initial crack and propagating due to the vibration during use. Therefore, especially in the case of high-energy transducers combined with welding of weld sensitive steel alloys, there is a considerable risk for long-term failure in such welded joints.

Furthermore, although welding ideally should ensure an ultrasonic energy transmission through the member, e.g. through a wall, virtually without energy losses, the welding process makes the member uneven and dented which creates a risk that air is entrapped between the transducer and the surface of the member. In such a case considerable energy transmission losses could result. It should be noted that even in the case of high-energy transducers the wall thickness of the member has to be limited, typically to about 4 mm, since the combined thickness of the wall and the transducer emitting body becomes so large that the ultrasound energy transmission efficiency will be reduced due to the stiffness of the vibrating components.

In a case wherein the member is made of titanium, the process of welding is both difficult and expensive.

These known methods also have the disadvantage that an ultrasonic transducer cannot be easily replaced, for example after a malfunction.

It is also possible to attach an ultrasonic transducer to a member, such as the wall of a vessel, with bolts through the transducer emitting body and into the wall, but such a joint exhibits substantially the same disadvantages as described above except that it provides the possibility to replace the transducer in the case of a failure.

Therefore, there is a need for a method to attach ultrasonic transducer to a member such as a wall of a vessel or a beam that ensures highly efficient energy transfer as well as the possibility to replace a transducer.

SUMMARY OF THE INVENTION

In a first aspect, it is an object of the present invention to provide a method for mounting an ultrasonic transducer onto a supporting body, said method providing a secure long-term attachment of the transducer to the supporting body, while providing excellent transmission efficiency and easy replacement of the transducer.

This object is achieved with a method according to claim 1 of the appended claims.

In a second aspect, it is the object of the present invention to provide a coupling member for secure long-term attachment of an ultrasonic transducer to a supporting body, said coupling providing excellent transmission efficiency and easy replacement of the transducer.

This object is achieved with a device according to claim 15 of the appended claims.

Embodiments, advantages and scope of applicability of the present invention will become apparent from the detailed description given hereinafter. However, it should be understood that the detailed description and specific examples, while indicating preferred embodiments of the invention are given by way of illustration only. Various changes and modifications within the spirit and scope of the invention will become apparent to those skilled in the art from this detailed description.

Embodiments of the present invention will be described in detail in the following, wherein the accompanying drawings which are given by way of illustration only, and thus are not limiting the present invention, and wherein

BRIEF DESCRIPTION OF THE DRAWINGS

FIG. 9 is a cross-sectional view of a coupling member according to the invention mounted in an opening of a supporting body and fastened by welding.

FIG. 11 is a cross-sectional view of the assembly of FIG. 10, taken along the line I—I of FIG. 10.

DETAILED DESCRIPTION OF PREFERRED EMBODIMENTS

Common to all embodiments of the present invention is that the emitting body of a conventional ultrasonic transducer, i.e. that part of a conventional transducer that is attached to a supporting body, such as a wall using any of the previously known methods for attaching an ultrasonic transducer, is replaced by an integrally formed protrusion on a section of the supporting body.

The protrusion could be formed directly on the supporting body, although under many circumstances a specially formed separate coupling member comprising the protrusion is preferred. In use, said coupling member forms an operative part of the wall, beam or any other supporting member to which the transducer is to be attached, and is provided with an integrally formed projection for mating with the main body of the ultrasonic transducer. Consequently, the ultrasonic transducer main body is adapted for cooperative engagement with the projection of the member. When mated, the projection and the ultrasonic transducer main body form an ultrasonic transducer assembly.

Thus, the coupling member of the invention could be an integrated section of a wall of a vessel or a conduit, a beam or any other type of ultrasonic transducer supporting body, or a separate member being attached to such a supporting body. In use, one side of the coupling member is in contact with the fluid into which the ultrasonic energy is transferred, while the other side of the coupling member forms an operative part of the ultrasonic transducer.

For simplicity, most of the embodiments described below will be based on the assumption that the ultrasonic transducer is to be mounted on a supporting body constituting a vessel wall, but of course it should be understood that the invention is as useful for mounting an ultrasonic transducer onto any suitable object.

Figure 1:
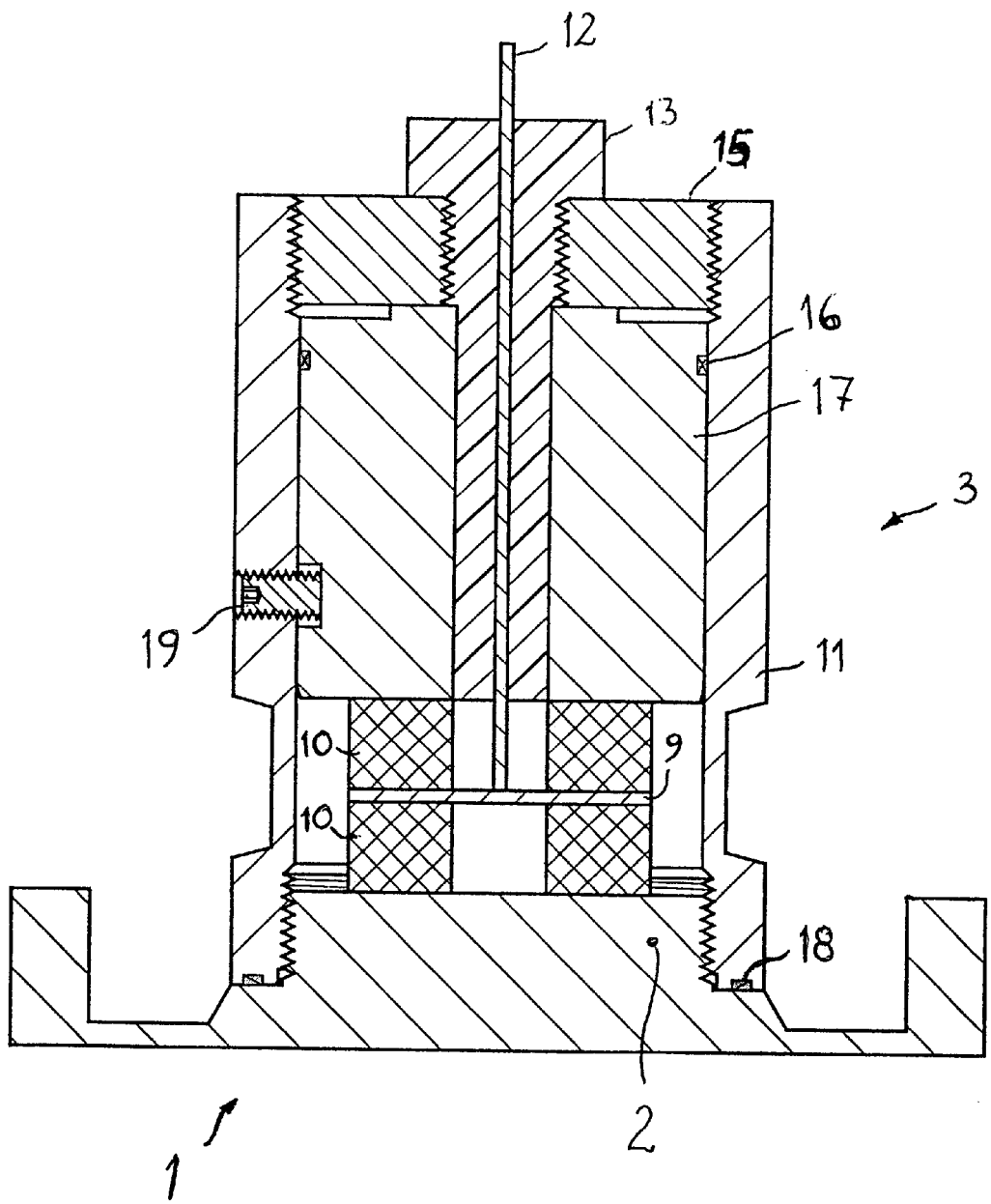
FIG. 1 is a cross-sectional view of an ultrasonic transducer assembly, including an embodiment of a coupling member according to the invention.
Figure 2:
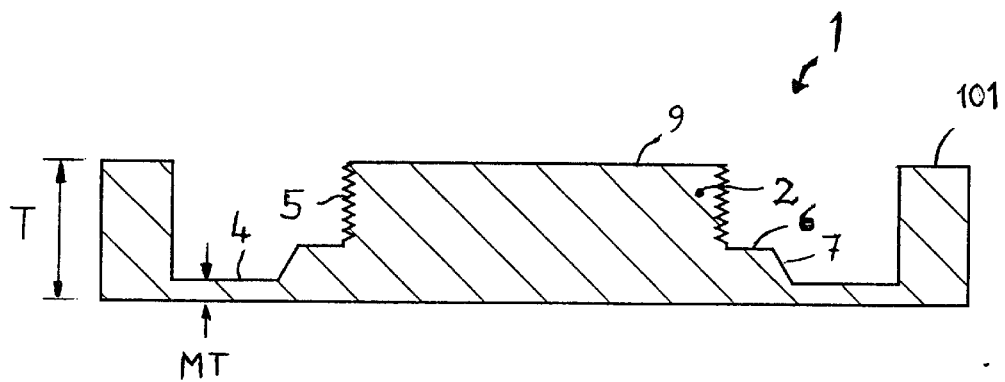
FIG. 2 is a cross-sectional view of an embodiment of a coupling member according to the invention.

A first embodiment of a coupling member 1 according to the present invention is shown in FIG. 1, and is also shown in FIG. 2 having an ultrasonic transducer main body 3 being attached thereto. It should be noted that the ultrasonic transducer main body could be of a conventional design, i.e. it is a conventional ultrasonic transducer with its conventional emitting end part removed.

The coupling member 1 is formed with a projection 2. Although it is possible to foresee other shapes, a generally cylindrical shape is presently viewed as the most advantageous, both for reasons of strength and of simple manufacturing. In order to clearly understand the shape of the projection, reference is made to the perspective view of a coupling member having several such projections shown in FIG. 6. The projection 2 is provided with threads 5 for attaching the ultrasonic transducer main body 3 thereto in cooperative engagement.

The projection 2 is cut out from a member with an initial thickness T, selected to correspond to the height of the projection, using a milling operation to remove material around the projection. The member is milled to a desired thickness MT at a bottom area 4 surrounding the stepped, cylindrical projection 1. In the case were the member is mounted to form a part of a wall of a vessel, the thickness MT should be selected to withstand any pressure that may arise in the vessel with a proper safety margin.

A step 7 having a sealing surface 6 is provided between the threaded portion 5 and the bottom area 4. The step is of a generally conical shape that is well known within the art to distribute ultrasound energy from piezoelectric elements 10 in the ultrasonic transducer.

The ultrasonic transducer main body 3, which in itself is not new, is provided with a housing 11. The housing is provided with inner threads at one end for engagement with the threads 5 of the projection 2. An O-ring 18 disposed in an annular channel in the end surface of the housing acts as a sealing between the housing 11 and the sealing surface 6 of the coupling member 1.

When, in the present embodiment, an ultrasonic transducer main body 3 is to be connected to the member it is simply screwed onto the threaded portion 5 of the projection 2 of the coupling member 1.

The height of the threaded portion 5 of the projection 2 is coordinated with the depth of the inner threads of the receiving opening of the ultrasonic transducer main body 3 to allow the end surface 9 of the projection 1 to abut against the adjacent piezoelectric element 10 of the transducer 3 under a pre-compression suitable for the application at hand, at the same time as the housing bottom end abuts against the sealing surface 6 of the step of the projection 2, with the O-ring 18 acting as a sealing Although not part of the invention in itself, the ultrasonic transducer according to FIG. 1 also includes an inner body 17, a sealing 16 between the inner body 17 and the housing 11, an end lid 15, an insulating central body 13, a connecting member 12 for supplying electric energy from an external source (not shown), a contact plate 9 connected to the connecting member 12 for distributing energy to the piezoelectric elements 10, and a locking screw 19 for preventing torsion of the inner body 17 during mounting of the main body 3 onto the coupling member 1.

Figure 6:
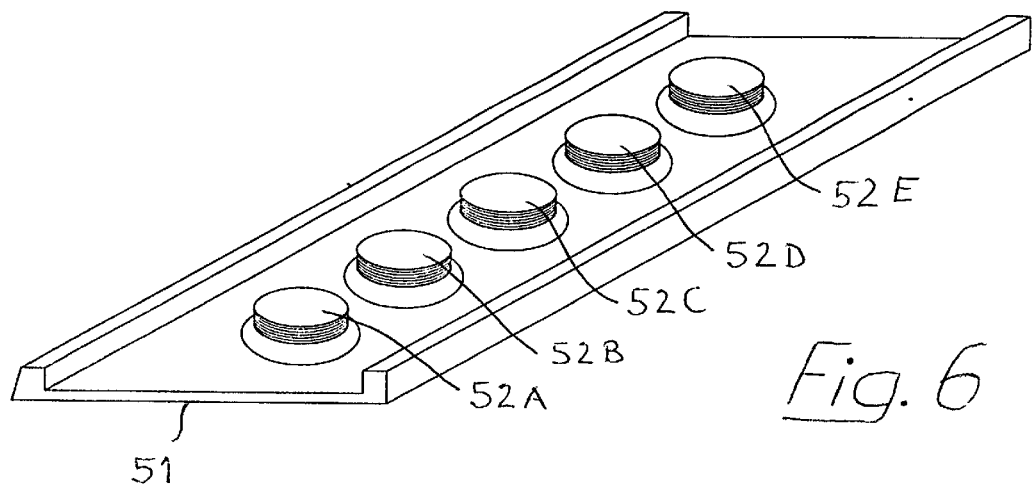
FIG. 6 is a perspective view of a beam-like embodiment of a coupling member according to the invention having several protrusions.

The coupling member 1 of FIG. 2 is shown having an integrated mounting frame 101 of extended thickness with respect to the bottom area 4. In addition to serving as areas for joining the coupling member to a wall, the mounting frame acts as an acoustic barrier to define a vibrating area inside the frame, as will be described below. Depending on the application, the mounting frame could surround the entire peripheral edge of the coupling member (as is suggested in FIG. 9) or be provided as two sections on opposing sides of the coupling member (as is illustrated in FIG. 6).

When mounting the coupling member according to the invention to a wall the following steps are necessary:

providing an opening in the wall, the opening being corresponding in shape to the coupling member;

covering the opening in the wall with the coupling member in such a way that the projection of the coupling member is at the outside of the wall with respect to the fluid to be energized with ultrasonic energy;

connecting the coupling member along its edges and to the wall;

mate the projection with an ultrasonic transducer main body to provide an ultrasonic transducer assembly.

The step of providing the opening in the wall, which could be performed using any suitable conventional cutting process, should include the formation of such an opening wherein the coupling member fits with a tight fitting around the entire periphery. In an alternative embodiment, as will be described below, the opening is formed to such a shape that the coupling member fits tightly over the opening The step of covering the opening in the wall includes the insertion of the coupling member into the opening, as well as covering the opening and a border area surrounding the opening, as will be described below.

The step of connecting the coupling member to the wall includes the use of any suitable attachment means, such as welding, bolting or bonding. For example, a peripheral joint is welded edge-to-edge, at one or both sides of the wall to attach the coupling member in such a way that the inner surface of the vessel is substantially smooth, without any steps.

This is illustrated in the cross sectional view of FIG. 9, wherein a coupling member 21 is inserted into an opening in a wall 81 with tight fitting, and is fixed to the wall with a welded joint 82. When welding the coupling member to the wall it is preferred also to perform a stress-relieving anneal in order to reduce the risk of crack propagation due to the ultrasonic vibrations. A continuous welded joint also provides a sealed joint to avoid leakage of fluid.

Using the method and a coupling member according to the present invention allows substantially all the ultrasonic energy generated by the piezoelectric elements to be transmitted into the fluid via the oscillating coupling member. Of course, the shape and dimensions of the coupling member should be selected to suit the application at hand.

Some important considerations have to be made when designing the coupling member to be used in a specific application.

It is important that virtually all the ultrasonic energy is transferred into the receiving fluid. Any reflected energy will cause increased temperature somewhere in the assembly. Such increased temperature represents a loss and is typically not desired.

In some applications it is also important to avoid energy concentration at or near a small interface area between the transmitting member and the fluid. At the same time, the oscillating area should be acoustically limited in order not to bring adjacent parts of the supporting member into oscillation (which would result in energy losses).

Therefore, according to the invention it is preferred to define a resonance area by providing the oscillating member with an acoustically limiting means. This will now be described in more detail.

Figure 3:
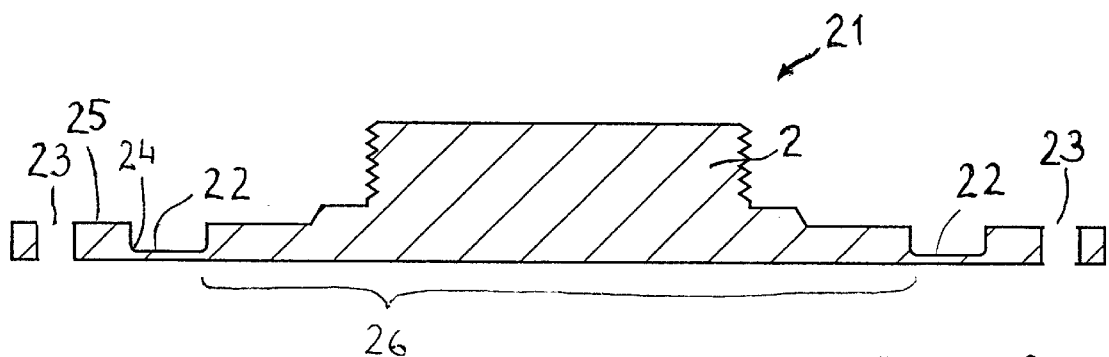
FIG. 3 is a cross-sectional view of another embodiment of a coupling member according to the invention.

A second embodiment of a coupling member 21 according to the present invention is shown in FIG. 3. The coupling member 21 of FIG. 3 differs from the coupling member 1 of FIG. 2 in that an oscillation-limiting groove 22 is provided around the projection 2, at the same side of the coupling member as the projection 2. A section 25 outside of the groove serves as an integrated mounting frame, similar to the frame 101 of FIG. 2.

The groove 22 extends around the oscillating center of the transducer in any selected way, such as circular, oblong or rectangular with corners having radii. The corners at bottom of the groove, which for example is milled, is preferably provided with fillets 24 to avoid crack initiating stress concentrations.

The ultrasonic transducer body 3 (not shown in FIG. 3) corresponds to the previously described embodiment of the present invention, and is mounted likewise. This is also the case for the remaining structural details of the coupling member 21, with the exception that through holes 23 have been formed through the mounting section 25 to be used when mounting the coupling member 21 to cover an opening in the wall of the vessel. This alternative method for attaching the coupling member will be explained in more detail later with reference to FIG. 5, but it should of course be understood that the attachment of a coupling member being provided with at least one groove could be as well be made using any suitable method, such as welding or bonding.

When the coupling member 21 is vibrated due to the action of the piezoelectric elements as described above, the oscillation will substantially be limited to the section 26 of the coupling member situated inside the groove. Therefore, losses due to low efficient vibration of the outer parts of the coupling member as well as adjacent areas of the vessel are significantly reduced.

At the same time, the central vibrating section 26 of the coupling member 21 is relatively stiff. Therefore, the central vibrating section 26 will distribute the ultrasonic energy transferred through the coupling member more uniformly over the vibrating area, as compared to a conventional mounting wherein a more pronounced central high peak amplitude is present with amplitudes decaying radially out from the center.

Thus, energy concentrations in the fluid receiving the ultrasound energy are significantly reduced.

Figure 4:
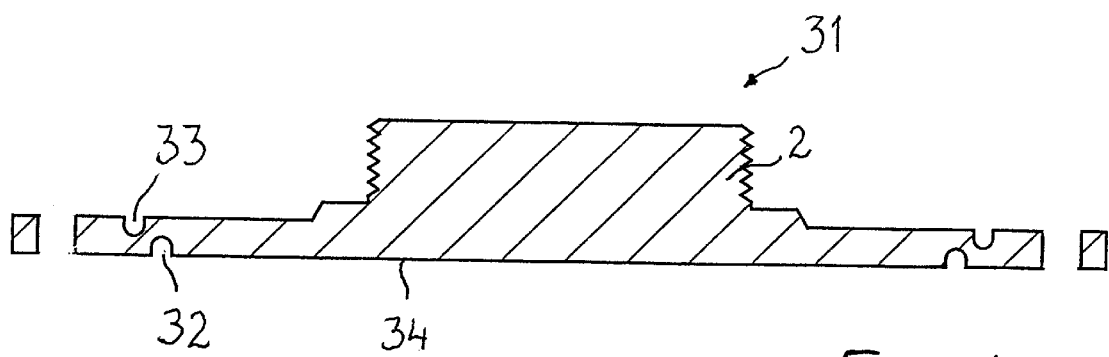
FIG. 4 is a cross-sectional view of yet another embodiment of a coupling member according to the invention.

FIG. 4 shows an embodiment of a coupling member 31 being provided with a first oscillation-limiting groove 32 and a second oscillation-limiting groove 33, both being formed around a projection 2 according to the present invention and both having bottoms with semi-circular cross-section to avoid stress concentration. The first groove is milled at the wet side of the coupling member 31, while the second groove 33 is formed on the transducer side of the coupling member and is with respect to the projection displaced radially outward the first groove 32.

This third embodiment of a coupling member 31 provides a more flexible border between the oscillating central portion 34 of the coupling member 31 and the portion of the member surrounding the grooves. The oscillating-limiting effect of the double grooves 32, 33 is also, to some extent, present in the radial direction.

In order to avoid that particles, or other matter, collect in the groove 32 on the wet side it is possible to fill it with an adhering material having suitable ductile properties, for example an epoxy material.

Of course an acoustically limiting effect could also be achieved with a groove on the wet side of the coupling member, only.

As has been mentioned above, instead of providing the coupling member according to the invention as a separate component to be connected to an opening in a wall, the coupling member could be formed as an integrated part of a vessel or a tube for containing a fluid to be energized with ultrasonic energy. In such a case the projection is cut out directly in the supporting body, thereby eliminating the need for the steps of making an opening in the supporting body and fastening the coupling member to the opening.

Such an embodiment could be relatively expensive in the case of a supporting body constituted by a vessel. However, in the case that the supporting body is a beam, for example for use in the wire section of a paper machine, it is preferred to machine the projection according to the invention directly in the beam material.

In some applications it may be more advantageous to mount the coupling member such that it covers the opening in the wall, instead of inserting it into the opening. For example, this is the case for a non-metal wall, such as the wall in a glass fiber reinforced epoxy tank. This is easily done by using through holes in the coupling member, such as the holes 23 of the coupling member 21 of in FIG. 3, to fasten the member with bolts or rivets.

Figure 5:
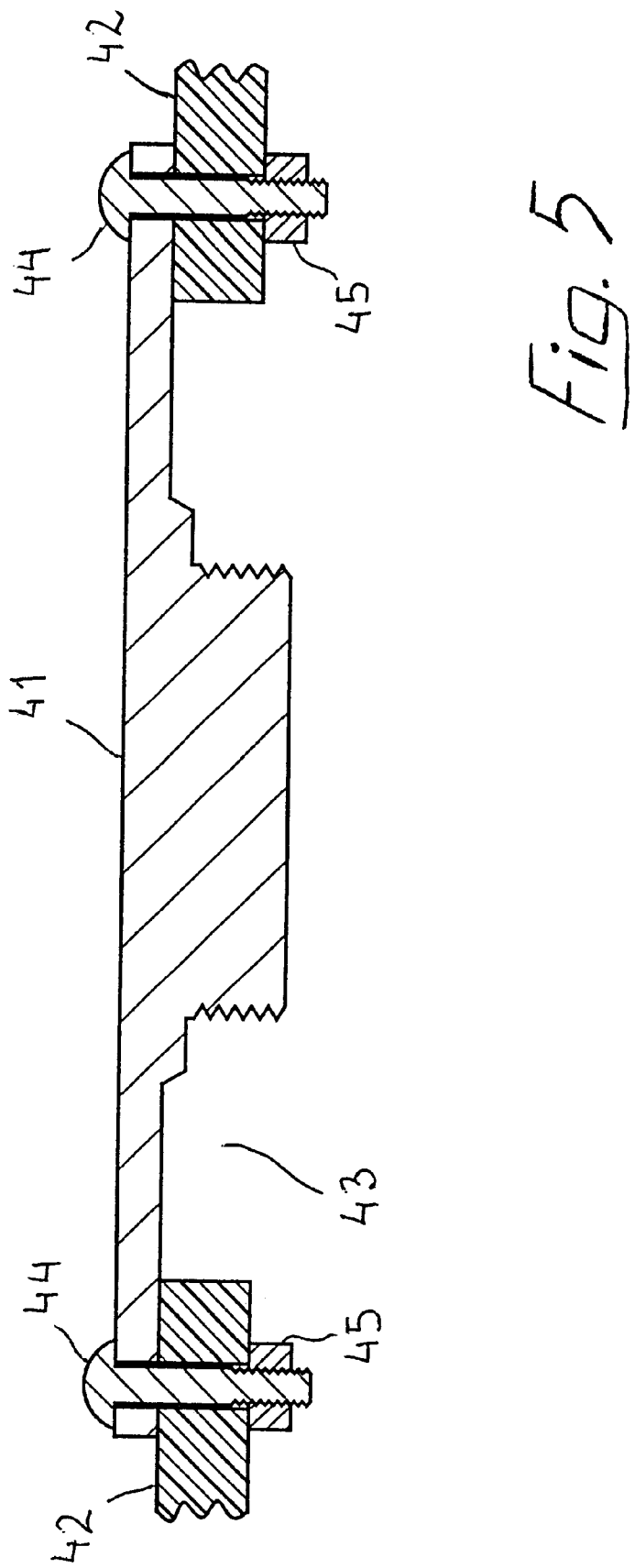
FIG. 5 is a cross-sectional view of a coupling member according to the invention mounted across an opening of a supporting body using bolts.

An embodiment of such a mounting is shown in FIG. 5, showing a coupling member 41 (without grooves) fastened to a wall 42 of a vessel surrounding an opening 43 in the vessel by bolts 44 and nuts 45. Since the vessel, being made of reinforced epoxy, is damping the acoustical vibrations transferred by the coupling member the need to provide grooves is reduced.

It is even possible to attach a coupling member that covers an opening in a supporting body by bonding, especially in the case where an acoustically limiting groove is provided. This is possible since the use of the coupling member according to the invention provides for low edge stresses of a bonded joint, when compared to a bonded conventional lower ultrasonic transducer member. Also, welding or even soldering could be used to fix a coupling member that covers an opening in the case of metal components.

Figure 10:
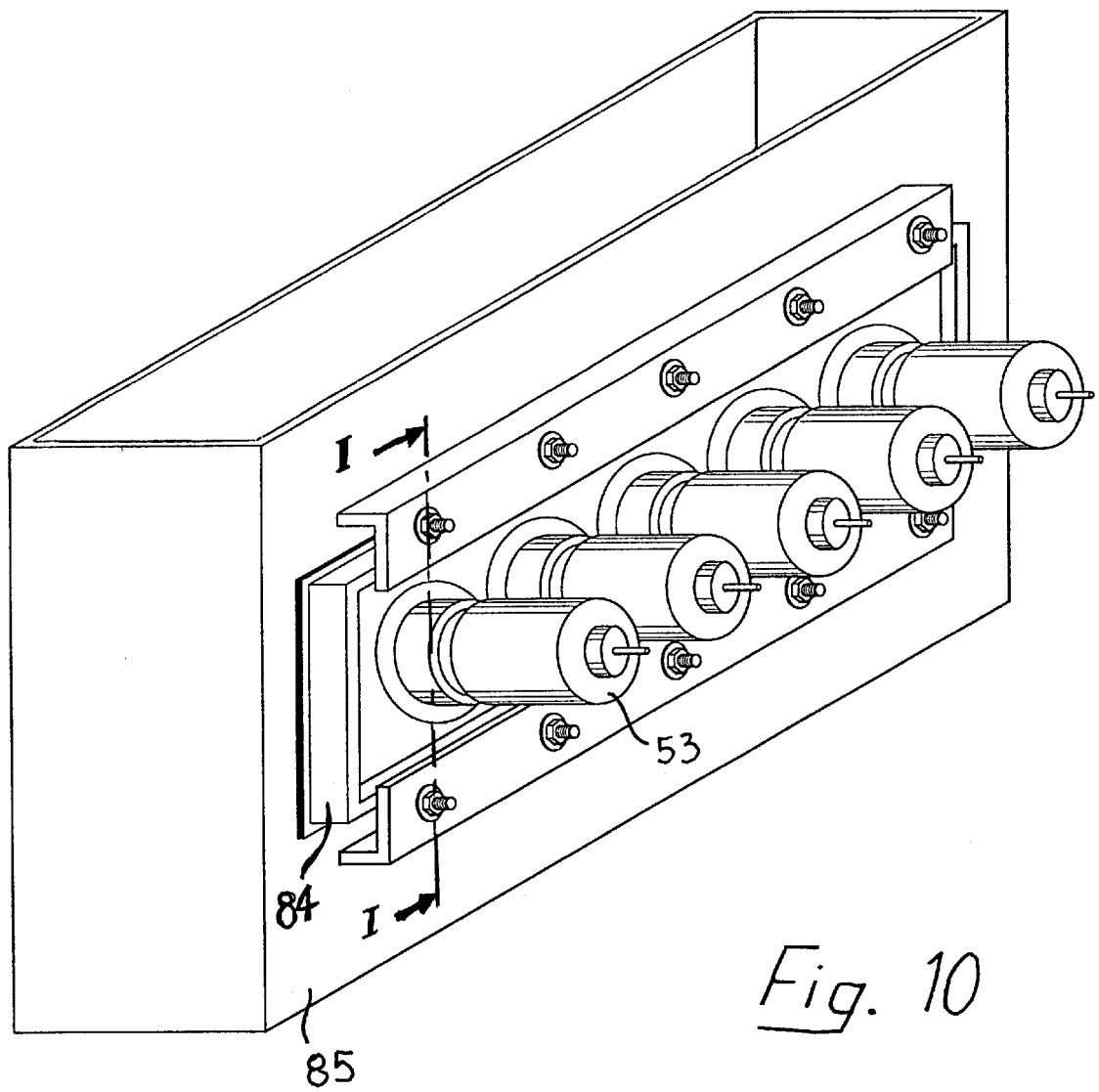
FIG. 10 is a perspective view of a coupling member according to the invention mounted across an opening of a supporting body using threaded pins and L-shaped members.

However, a presently preferred embodiment to cover an opening in a wall of a metal vessel, such as a stainless steel tank, is shown in FIG. 10 and 11.

FIG. 10 is a perspective view showing a coupling member 84 attached to a vessel wall 85. Five transducers 53 are mounted on the coupling member. FIG. 11 is a cross sectional view taken along line I—I of FIG. 10, but with the corresponding transducer removed for clarity. Near the edges of an opening 89 in the wall 85 are pins 87 inserted through corresponding holes through the wall and are fixed thereto by welded joints 88 at the "wet" side of the wall. Preferably, the welded joints are ground to provide a smooth surface against the fluid inside the vessel. Thus, the pins protrudes out from the wall 85. The pins are threaded 90.

The coupling member 84 is positioned to cover the opening in such a way that its emitting surface will act as a "wet" surface. A sealing 92, typically of rubber, is placed between the wall and the coupling member to avoid leakage.

The coupling member 84 is then clamped against the wall 85 by an elongated L-shaped member 86 at each longitudinal side. Each L-shaped member 86 is provided with holes 93 to allow it to be passed over the pins 87. Of course, the length of the L-shaped members is selected to suit the application at hand. Nuts 91 are threaded onto the pins 87 and are tightened to press the coupling member 84 against the wall 85 via the sealing 92.

According to the invention, the type of ultrasonic transducer in itself is not crucial for practicing the invention. It may, for example, generate ultrasonic energy by other means than piezoelectric elements, such as magnetostrictive elements. It may be of any energy rating, be cooled with any suitable technique etc., as long as it is provided with a fitting adapted to the projection provided on the member onto which the transducer is to be mounted.

Although the ultrasonic transducer body could be fixedly attached to the projection of the coupling member, for example by welding, it is preferred that the fitting is designed to allow for an exchange of transducer as described above, for example in case of a malfunction or a need to change the energy rating of the transducer. Thus, it should be understood that it is not necessary to attach the ultrasonic transducer body 3 to the coupling member by threads 6, 16. For example, a bayonet fitting could be used as well to provide a detachable coupling between the components. However, due to the lower cost of manufacturing the threaded coupling means described above is preferred.

Thus, according to the embodiments described above a method and a device for releasable attachment of an ultrasonic transducer to a supporting body, such as a wall of a vessel or a beam, for highly efficient energy transfer. With the invention, no air can be trapped between the transducer bottom and the wall and hence will not cause energy losses. Furthermore, the projection is not apt for crack propagation since all corners can easily be machined with a stress-relieving fillet.

The material of the member, including the projection, according to the invention could be any suitable metal, such as titanium or stainless steel.

Using the method of the present invention, it is possible to attach any selected number of transducers. It is also possible to attach ultrasonic transducers to a wide range of members, such as walls of any type of vessel or beams for contacting a fluid or any other matter to be treated with ultrasonic waves.

Figure 7:
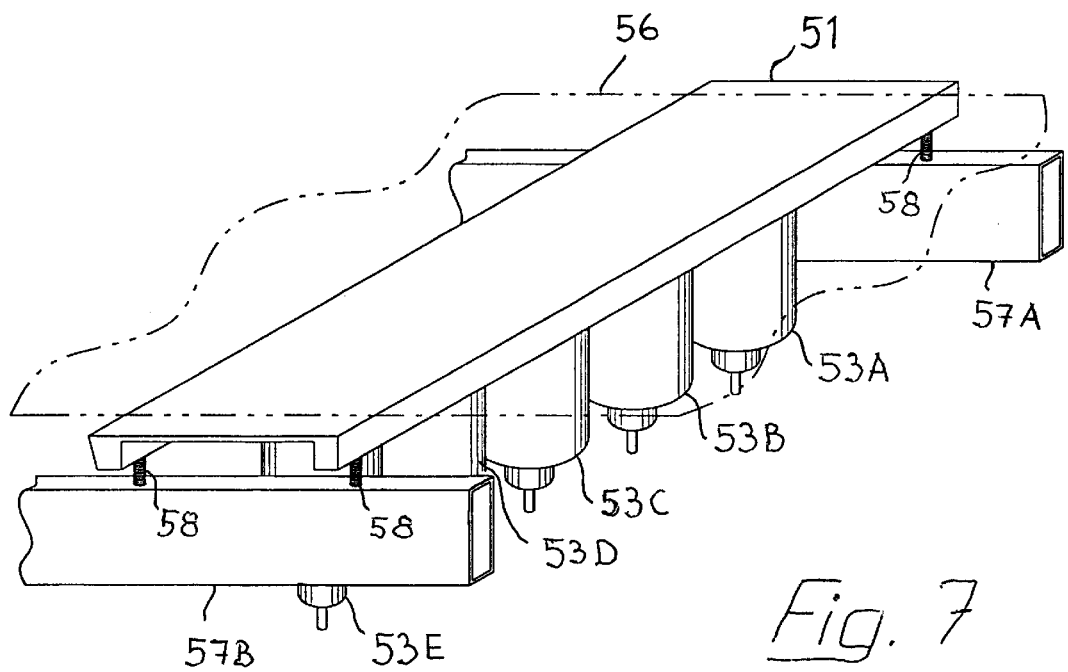
FIG. 7 is a perspective view of a the coupling member of FIG. 6 mounted in a paper making machine and provided with ultrasonic transducers.

For example, an embodiment of a flat beam-like coupling member 51 provided with five projections 52A–E according to the invention is shown in FIG. 6 and FIG. 7.

As is shown in FIG. 7, the coupling member 51 of FIG. 6 is mounted to a frame 57A, 57B via threaded pins 58. The frame is mounted on a paper-making machine (not shown). The coupling member 51 is mounted with the side having projections oriented downward, and its opposite flat surface being positioned directly under and arranged in contact with a wire 56 (for visibility illustrated with dotted lines) of the wet wire section of a paper making machine. Five ultrasonic transducers 53A–E are mounted on the projections 52A–E, respectively. By introducing ultrasonic energy into the paper stock using the coupling member 51 via the wire it is possible to affect the properties of the resulting paper.

Figure 8:
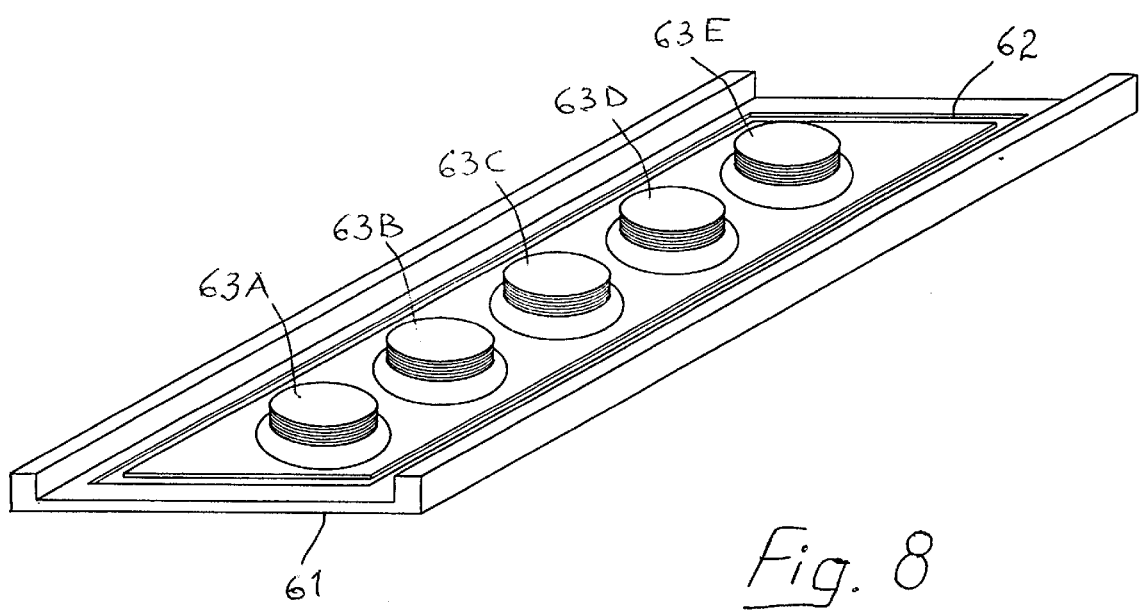
FIG. 8 is a perspective view of another beam-like embodiment of a coupling member according to the invention.

An embodiment of a beam-like coupling member 61, corresponding to the coupling member 51 of FIG. 6, being provided with an acoustically limiting groove 62 surrounding the projections 63A–E, is shown in FIG. 8.

In order to obtain an effectively operating assembly the individual ultrasonic transducer should be properly tuned for proper cooperation.

It is of course possible to design a coupling member, with the projection according to the invention, in other shapes than planar. For example, a member could be manufactured to be slightly curved to suit the curvature of a tube or a cylindrical vessel.

It is obvious that the invention as described herein may be varied or combined in many ways. Such variations are not to be regarded as a departure from the spirit and scope of the invention, and all such modifications as would be obvious to one skilled in the art are intended to be included within the scope of the following claims.

What is claimed is:

1. A method for attaching at lost one ultrasonic transducer assembly to a supporting body, the at least one ultrasonic transducer assembly including an ultrasonic transducer main body and an ultrasonic transducer emitting body, comprising the steps of:

providing the supporting body with a section with at least one integrally formed generally cylindrical projection for mating with the ultrasonic transducer main body, said section being adapted for contact with a liquid at one side, said section and said at least one integrally formed generally cylindrical projection forming the ultrasonic transducer emitting body; and mating the ultrasonic transducer main body with said at least one integrally formed cylindrical projection.

2. The method according to claim 1, wherein the step of providing the supporting body with a section with the at least one integrally formed generally cylindrical projection comprises the steps of:

forming the at least one integrally formed generally cylindrical projection by cutting a recess in a section of the wall of the supporting body, said recess surrounding a portion of not cut wall material which forms the at least one integrally formed generally cylindrical projection, and forming attaching means on the at least one integrally formed generally cylindrical projection adapted for mating with the ultrasonic transducer main body.

3. The method according to claim 1, wherein the step of providing the supporting body with a section with the at least one integrally formed generally cylindrical projection comprises the steps of:

integrally forming the at least one integrally formed generally cylindrical projection in a separate coupling member;

forming an opening in the supporting body; and inserting and fastening said separate coupling member in said opening with the at least one integrally formed generally cylindrical projection being directed outwardly with respect to the liquid side of the supporting body, said separate coupling member thereby forming a section of the supporting body.

4. The method according to claim 1, wherein the step of providing the supporting body with a section with the at least one integrally formed generally cylindrical projection comprises the steps of:

integrally forming the at least one integrally formed generally cylindrical projection in a separate coupling member;

forming an opening in the supporting body;

covering said opening with said separate coupling member with the at least one integrally formed generally cylindrical projection being directed outwardly with respect to the liquid side of the supporting body; and fastening said separate coupling member in its positions said separate coupling member thereby forming a section of the supporting body.

5. The method according to claim 1, wherein the step of providing the supporting body with a section with the at least one integrally formed generally cylindrical projection comprises The step of:

forming a thread on the at least one integrally formed generally cylindrical projection, corresponding to a thread on the ultrasonic transducer main body, for use when mating the parts of the ultrasonic transducer assembly.

6. The method according to claim 1, wherein the step of providing the supporting body with a section with the at least one integrally formed generally cylindrical projection comprises the step of:

forming a bayonet fitting on the at least one integrally formed generally cylindrical projection, corresponding to a bayonet fitting on the ultrasonic transducer main body, for use when mating the parts of the ultrasonic transducer assembly.

7. The method according to claim 2, wherein the step of providing the supporting body with a section with the at least one integrally formed generally cylindrical projection comprises the step of:

forming a thread on the at least one integrally formed generally cylindrical projection, corresponding to a thread on the ultrasonic transducer main body, for use when mating the parts of the ultrasonic transducer assembly.

8. The method according to claim 2, wherein the step of providing the supporting body with a section with the at least one integrally formed generally cylindrical projection comprises the step of:

forming a bayonet fitting on the at least one integrally formed generally cylindrical projection, corresponding to a bayonet fitting on the ultrasonic transducer main body, for use when mating the parts of the ultrasonic transducer assembly.

9. The method according to claim 3, wherein the step of providing the supporting body with a section with the at least one integrally formed generally cylindrical projection comprises the step of:

forming a thread on the at least one integrally formed generally cylindrical projection, corresponding to a thread on the ultrasonic transducer main body, for use when mating the parts of the ultrasonic transducer assembly.

10. The method according to claim 3, wherein the step of providing the supporting body with a section with The at least one integrally formed generally cylindrical projection comprises the step of:

forming a bayonet fitting on the at least one integrally formed generally cylindrical projection, corresponding to a bayonet fitting on the ultrasonic transducer main body, for use when mating the parts of the ultrasonic transducer assembly.

11. The method according to claim 4, wherein the step of providing the supporting body with a section with the at least one integrally formed generally cylindrical projection comprises the step of:

forming a thread on the at least one integrally formed generally cylindrical projection, corresponding to a thread on the ultrasonic transducer main body, for use when mating the parts of the ultrasonic transducer assembly.

12. The method according to claim 4, wherein the step of providing the supporting body with a section with the at least one integrally formed generally cylindrical projection comprises the step of:

forming a bayonet fitting on the at least one integrally formed generally cylindrical projection, corresponding to a bayonet fitting on the ultrasonic transducer main body, for use when mating the parts of the ultrasonic transducer assembly.

13. The method according to claim 3, wherein the step of fastening said separate coupling member further includes the step of:

welding said separate coupling member to an edge of said opening.

14. The method according to claim 4, wherein the step of fastening said separate coupling member further includes the steps of forming holes through a wall surrounding said opening;

forming holes through said separate coupling member at positions corresponding to the positions of said holes formed through the wall; and securing said separate coupling member to the wall by means of bolts through said holes in said separate coupling member and in the wall, respectively.

15. The method according to claim 4, wherein the step of fastening said coupling member further includes the steps of:

welding threaded-pins to a wall surrounding said opening;

providing L-shaped elongated members with holes at positions corresponding to positions for said threaded pins;

mounting said L-shaped elongated members onto the threaded pins to contact said separate coupling member; and clamping said separate coupling member across said opening, via the L-shaped elongated members by tightening nuts on the threaded pins.

16. A coupling member for mating with an ultrasonic transducer main body to form an ultrasonic transducer assembly, comprising:

a surface for contact with a liquid;

at least one integrally formed generally cylindrical projection at a side opposite to said surface for contact with the liquid, said at least one generally cylindrical projection being adapted to mate with the ultrasonic transducer main body; and means for attaching said coupling member to a supporting body.

17. The coupling member according to claim 16, wherein a generally circumferential groove is formed around the at least one integrally formed generally cylindrical projection at the same side of said coupling member as the at least one integrally formed generally cylindrical projection.

18. The coupling member according to claim 16, wherein a generally circumferential groove is formed around the at least one integrally formed generally cylindrical projection at the liquid side of said coupling member.

19. The coupling member according to claim 18, wherein a second generally circumferential groove is formed around the at least one integrally formed generally cylindrical projection at the liquid side of said coupling member.

20. The coupling member according to claim 16, wherein said means for attaching said coupling member to the supporting body is at least one edge encircling said coupling member and adapted for welding against the supporting body.

21. The coupling member according to claim 16, wherein said means for attaching said coupling member to the supporting body is at least one edge encircling said coupling member and adapted for welding against the supporting body.

22. The coupling member according to claim 18, wherein said means for attaching said coupling member to the supporting body is at least one edge encircling said coupling member and adapted for welding against the supporting body.

23. The coupling member according to claim 16, wherein said means for attaching said coupling member to the supporting body is at least one through hole for receiving bolts for bolting said coupling member to the supporting body.

24. The coupling member according to claim 17, wherein said means for attaching said coupling member to the supporting body is at least one through hole for receiving bolts for bolting said coupling member to the supporting body.

25. The coupling member according to claim 18, wherein said means for attaching said coupling member to the supporting body is at least one through hole for receiving bolts for bolting said coupling member to the supporting body.

26. The coupling member according to claim 16, wherein the at least one integrally formed generally cylindrical projection is provided with threads for engagement with a corresponding threads of the ultrasonic transducer main body.

27. The coupling member according to claim 16, wherein he at least one integrally formed generally cylindrical projection is provided with a bayonet fitting for engagement with a corresponding bayonet fitting of the ultrasonic transducer main body.

* * * * *

UNITED STATES PATENT AND TRADEMARK OFFICE
CERTIFICATE OF CORRECTION

PATENT NO.    : 6,308,585 B1
DATED         : October 30, 2001
INVENTOR(S)   : Bo Nilsson et al.

It is certified that error appears in the above-identified patent and that said Letters Patent is hereby corrected as shown below:

Column 8,
Line 44, replace "lost" with -- least --

Column 9,
Line 31, replace "positions" with -- position --

Column 10,
Line 14, replace "The" with -- the --
Line 58, replace "threaded-pins" with -- threaded pins --

Column 12,
Line 29, replace "he" with -- the --

Signed and Sealed this

Ninth Day of April, 2002

Attest:

Attesting Officer

JAMES E. ROGAN
Director of the United States Patent and Trademark Office